A. L. WILLCOCKS & A. P. THORLEY.
BLUING DEVICE.
APPLICATION FILED NOV. 30, 1908.
939,649.
Patented Nov. 9, 1909.
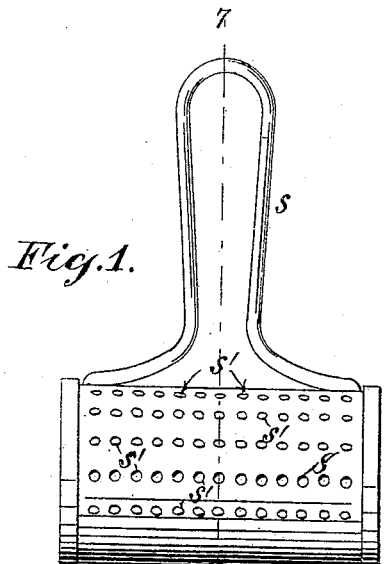
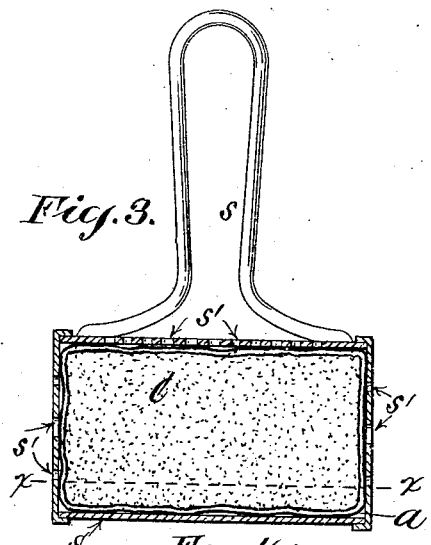
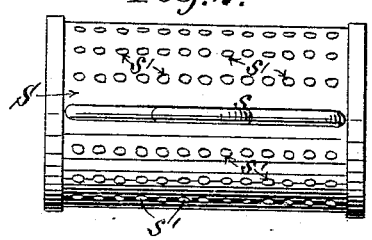
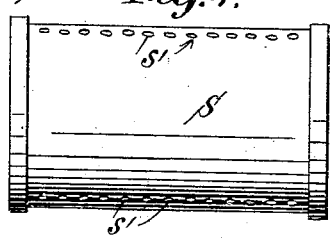
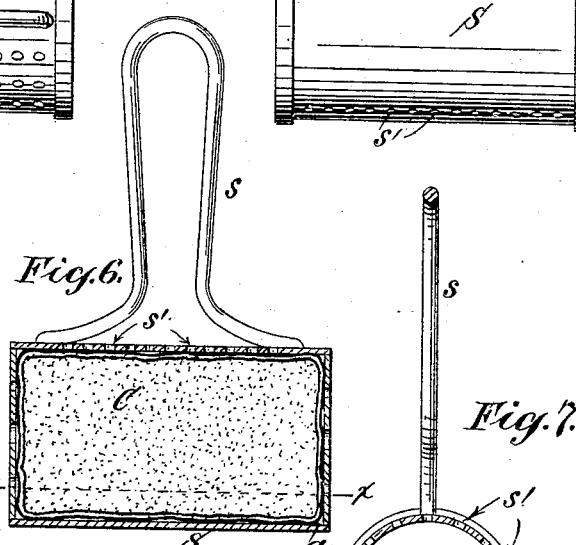
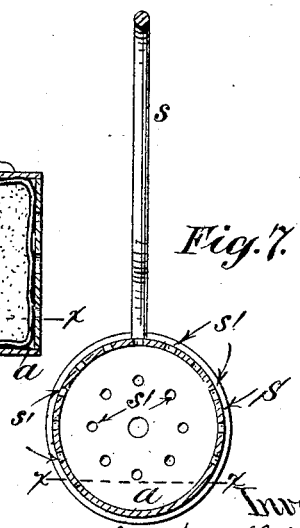

UNITED STATES PATENT OFFICE.

ABRAHAM L. WILLCOCKS AND ALFRED P. THORLEY, OF NEW YORK, N. Y.

BLUING DEVICE.

939,649.     Specification of Letters Patent.     Patented Nov. 9, 1909.

Application filed November 30, 1908. Serial No. 465,039.

*To all whom it may concern:*

Be it known that we, ABRAHAM L. WILLCOCKS and ALFRED P. THORLEY, citizens of the United States, residing in the borough of Manhattan, city, county, and State of New York, have invented certain new and useful Improvements in Bluing Devices for Laundry Purposes, of which the following is a specification.

Our invention is designed to afford a cheap but effective holder for bluing for laundry purposes, by means of which pure coloring matter may be used in powdered form in such manner that only the solution thereof can enter the bluing water. We thus, by preventing the escape of undissolved coloring matter into the bluing water, not only prevent the streaking or discoloring of the linen treated therein, but also enable the user to economize in the quantity of bluing used, at the same time avoiding the necessity of contact with the bluing material or with the concentrated solution of coloring matter as it escapes from the holder. Furthermore, we guard against discolorization of extraneous objects by drip from the holder after use, and attain other practical advantages hereinafter enumerated.

Our invention consists essentially of an original package formed of a porous bag or cartridge, containing soluble bluing material, inclosed in a stiff perforated shell provided with a handle, substantially as hereinafter described and claimed specifically, an incidental feature being the provision of an anti-drip space at the bottom of the receptacle.

In the accompanying drawings, Figure 1, is a side elevation of our improved bluing device; Fig. 2, a top view thereof; Fig. 3, a longitudinal section of the same, the handle being shown in elevation; Fig. 4, is a bottom view of the device; Fig. 5, an end view thereof; Fig. 6, a view similar to Fig. 3, showing a modification of structure; Fig. 7, a transverse section upon plane of line 7—7— Fig. 1, the cartridge being omitted.

Our device for bluing water for laundry purposes consists primarily of a porous bag or cartridge C, containing indigo, Prussian blue or other soluble coloring matter used in laundry work for counteracting the yellow tinge of linen, and a stiff perforated shell S inclosing said cartridge and provided with a suitable handle $s$.

The shell S is preferably, although not necessarily cylindrical in shape, and is formed with a series of holes $s'$, in its ends, sides and top portion, but not at the bottom, which is imperforate to form an anti-drip trough $a$, below the level of the line $x$, $x$, shown in Figs. 3, 6 and 7, to hold and retain any residual moisture contained in the cartridge after the shell has been removed from the water and drained more or less. This is to guard against drip that might otherwise soil extraneous objects.

The handle $s$, is preferably made in the form of a loop by which the device may be hung in an upright position when not in use, thus preventing the escape of the solution contained in the anti-drip trough $a$. The handle is also of sufficient length to provide for the convenient manipulation of the device without hand contact with the shell or water.

Being designed as an original package, to be discarded after the contained bluing material has been dissolved away, the ends of the shell may be forced into the body as in Fig. 6, or onto the body portion as in the other figures of the drawings or otherwise constructed as may be found most expedient.

By the use of the porous bag or cartridge C, we are enabled to use pure coloring matter in powdered form, thereby avoiding the objectionable bases or binders employed when the coloring medium is prepared in the form of cakes, balls or other solid structure,—such bases or binders being objectionable not only as impurities, but also because they are liable to streak and discolor the linen immersed in the water in which they are dissolved with the bluing.

By our invention we promote cleanliness, economy of coloring matter, and purity of color; and are enabled to use powdered material which will dissolve quickly. Furthermore the coloring material can escape from the shell only when and as dissolved by the water in which it is immersed, the porous bag or cartridge permitting the solution to percolate through it, but effectually retaining the undissolved powder.

The cost of the device as an original package is compensated for by the economy of coloring matter attained, as well as by the other advantages of cleanliness and convenience.

What we claim as our invention and desire to secure by Letters Patent is,

An original package of the character described consisting of a porous bag containing a soluble coloring matter, a stiff cylindrical shaped shell having perforations in its ends and sides and an imperforated bottom forming an anti drip trough and provided with a looped shaped handle secured to the shell at right angles to the plane of the anti drip trough as and for the purpose set forth.

ABRAHAM L. WILLCOCKS.
ALFRED P. THORLEY.

Witnesses:
GEO. WM. MIATT,
D. W. GARDNER.